United States Patent [19]
Inoue

[11] Patent Number: 5,592,825
[45] Date of Patent: Jan. 14, 1997

[54] ABSORPTION REFRIGERATION MACHINE

[75] Inventor: Naoyuki Inoue, Kanagawa-ken, Japan

[73] Assignee: Ebara Corporation, Tokyo, Japan

[21] Appl. No.: 520,468

[22] Filed: Aug. 28, 1995

[30] Foreign Application Priority Data

Aug. 30, 1994 [JP] Japan .................................. 6-227439
Sep. 13, 1994 [JP] Japan .................................. 6-243401
Sep. 16, 1994 [JP] Japan .................................. 6-246723

[51] Int. Cl.$^6$ ................................................ F25B 15/00
[52] U.S. Cl. ........................................ 62/141; 62/476
[58] Field of Search ............................ 62/476, 105, 141, 62/483

[56] References Cited

FOREIGN PATENT DOCUMENTS

54-182458  6/1978  Japan .
62-77567   9/1985  Japan .

Primary Examiner—William Doerrler
Attorney, Agent, or Firm—Armstrong, Westerman, Hattori, McLeland & Naughton

[57] ABSTRACT

An absorption refrigerating machine comprising an absorber A, an evaporator E, a generator GH, GL, a condenser C, a heat exchanger XH, XL, and solution circuits 1, 2, etc. and refrigerant circuits 10, 11, etc. for connecting the elements. A concentrated solution is directed from the generators to the absorber A through a solution spray pump $P_3$ which is provided with a controller 15 for controlling number of revolutions of the pump on the basis of a signal representative of a level of refrigerant liquid detected by a sensor 14 or concentration of solution so as to effect circulation of the refrigerant solution safely and efficiently. The absorption refrigerating machine can be a double effect absorption refrigerating machine wherein a refrigerant gas generated in a high temperature generator GH is used as a heat source of a low temperature generator GL.

14 Claims, 11 Drawing Sheets

ABSORPTION REFRIGERATION MACHINE

BACKGROUND OF THE INVENTION

1. Field of the Invention

The present invention relates to an absorption refrigerating machine capable of circulating solution efficiently, and more particularly, it relates to a double effect absorption refrigerating machine in which a flow rate of a diluted solution circulating through high and low temperature generators is controlled to achieve effective performance, and a double effect absorption cold or hot water generating machine controlled in a corresponding manner.

2. Prior Art

Figure 3:
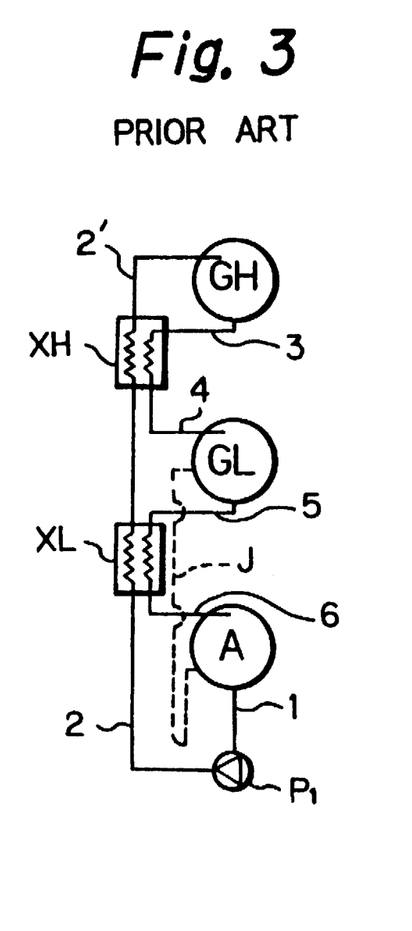
FIG. 3 is a solution circuit of a conventional double effect absorption refrigerating machine.
Figure 4:
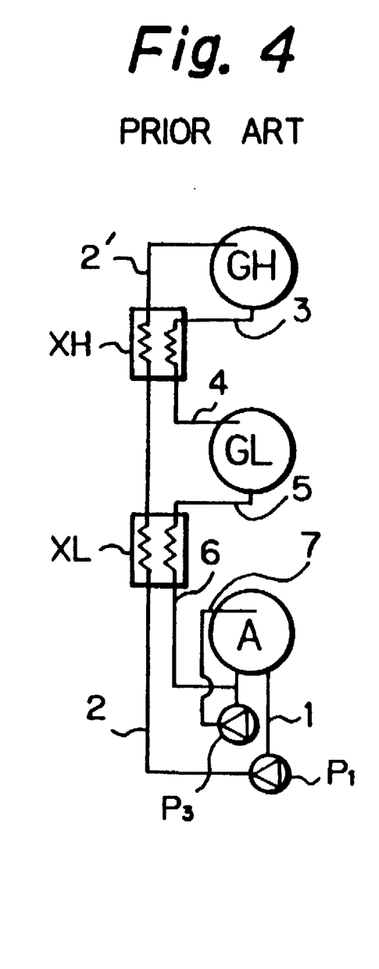
FIG. 4 is a hydraulic circuit of another conventional double effect absorption refrigerating machine.

Conventionally, the coefficient of heat recovery of heat exchangers had to be increased in order to improve the efficiency (COP; coefficient of result) of refrigerating machines. In this case, however, pressure loss of the heat exchangers had a tendency to be increased. For example, in a conventional absorption refrigerating machine, as shown in FIG. 3, since the solution is not completely returned to an absorber A, if pressure loss of a low temperature heat exchanger XL is increased, a J line shown by the broken line is provided to return the solution directly from the low temperature generator to the absorber, and the solution is often returned through the J line. In this case, however, the efficiency is considerably lowered. To avoid this, as shown in FIG. 4, a solution spray pump $P_3$ is provided for backing up the pressure. In this case, however, since the solution to be circulated is circulated by the single solution spray pump, an amount of solution circulating through the respective circuits cannot be adjusted independently and a problem arises in respect to how to adjust the circulating solution.

In normal absorption refrigerating machines, a heat amount of a heat source is adjusted on the basis of a cooling load signal or a cold water temperature signal. Further, in double effect absorption refrigerating machines, the difference in pressure and positional head between a high temperature generator and an absorber provide a driving force for flowing solution from the high temperature generator to the absorber. In general, the flow resistance in solution paths is adjusted (for example, by providing orifices) to obtain desired flow rate under the action of a driving force in a rated condition.

In this way, when the pressure in the high temperature generator is changed, since the above-mentioned driving force is also changed, an amount of solution flowing out of the high temperature generator is changed. A flow-in amount of solution flowing into the high temperature generator is adjusted to compensate for the amount of solution flowing out of the high temperature generator. In order to adjust such a flow-in amount, conventionally, a regulating valve was provided in a diluted solution path between an absorber and a generator, as disclosed in the JP-U-54-182458 (Japanese Utility Model Laid-open No. 182458/79). By the way, although the amount of solution circulating through a low temperature generator is associated with pressure and temperature of the high temperature generator, in the past, a technique in which the pressure and temperature of the high temperature generator is controlled by controlling the amount of solution circulating through the low temperature generator had not been effected.

SUMMARY OF THE INVENTION (Problems which the Invention is to Solve)

An object of the present invention is to provide an absorption refrigerating machine which can solve the above-mentioned conventional problems and can effect a circulation of refrigerant solution safely and efficiently.

A further object of the present invention is to provide a double effect absorption refrigerating machine in which effective performance can be achieved following the fluctuation of a cooling load by controlling amounts of solution circulating through a high temperature generator and a low temperature generator.

Yet another object of the present invention is to provide an absorption refrigerating machine which can adjust an amount of solution circulating through the respective circuit independently and can operate efficiently and economically.

(Means for Solving the Problems)

To solve the above-mentioned problems, according to the present invention, there is provided an absorption refrigerating machine comprising an absorber, an evaporator, a generator, a condenser and a solution heat exchanger, which are connected to each other through a solution circuit and a refrigerant circuit so that concentrated solution from the solution heat exchanger is directed to the absorber through a solution spray pump, wherein the solution spray pump is provided with a revolution number adjusting means for controlling the number of revolutions of the pump on the basis of a signal representative of a level of refrigerant liquid in the evaporator or a concentration of solution in the cycle.

According to the present invention, there is also provided a double effect absorption refrigerating machine comprising an absorber, an evaporator, a high temperature generator, a low temperature generator, a condenser, a high temperature heat exchanger and a low temperature heat exchanger, all of which are connected to each other through solution circuits and refrigerant circuits so that concentrated solution from the low temperature heat exchanger passing through the high and low temperature generators is directed to the absorber through a solution spray pump, wherein the solution spray pump is provided with a revolution number controller for controlling the. number of revolutions of the pump on the basis of a signal representative of a level of refrigerant in the evaporator or the concentration of solution in the cycle.

According to the present invention, there is provided a double effect absorption refrigerating machine comprising an absorber, an evaporator, a high temperature generator, a low temperature generator, a condenser, a high temperature heat exchanger, a low temperature heat exchanger, a solution path, a refrigerant path, and a cold water path; the high temperature generator is provided with a heat source heat amount controller for adjusting a heat amount of a heat source to be supplied to the high temperature generator on the basis of a cooling load signal or a cold water temperature signal from the cold water path, wherein a high head pump is disposed in the solution path between the absorber and the high temperature generator, and a controller for adjusting an amount of liquid circulating through the high temperature generator on the basis of a signal from a liquid level sensor which is disposed at an outlet portion of the high temperature generator or in an outlet piping from the high temperature generator is provided in association with the high head pump, and, further, a low head pump is disposed in the solution path between the absorber and the low temperature generator, and a controller for adjusting an amount of solution circulating through the low temperature generator is provided to maintain a pressure or a saturated temperature of the high temperature generator within a predetermined range in association with the low head pump.

In the above-mentioned absorption refrigerating machine, it is preferable that the controllers for the high and low temperature generators comprise circulating amount control valves or inverters for adjusting the number of revolutions of the high head pump or the low head pump. Further, it is preferable that the amount of solution circulating through the low temperature generator is adjusted by attaining a target pressure or a target temperature set with regard to the high temperature generator, on the basis of the heat source heat amount, the cooling load signal or the cold water temperature signal and/or on the basis of a signal from a sensor for detecting the pressure or the saturated temperature of the high temperature generator. The target pressure or the target temperature of the high temperature generator may be corrected by the temperature of the cooling water.

According to the present invention, there is provided a double effect absorption refrigerating machine comprising an absorber, an evaporator, a high temperature generator, a low temperature generator, a condenser, a high temperature heat exchanger and a low temperature heat exchanger, all of which are connected to each other through a solution circuit and a refrigerant circuit, wherein the solution circuit comprises a first diluted solution circuit for supplying diluted solution from the absorber to the high temperature generator through the high temperature heat exchanger, a second diluted solution circuit for supplying the diluted solution from the absorber to the low temperature generator through the low temperature heat exchanger, a first concentrated solution circuit for directing concentrated solution from the high temperature generator to a spraying device of the absorber or a piping connected to the spraying device through the high temperature heat exchanger, and a second concentrated solution circuit for directing concentrated solution from the low temperature generator to the spraying device of the absorber through the low temperature heat exchanger and a solution spray pump.

In the present invention, preferably, the solution spray pump is provided with a revolution number controller for controlling the number of revolutions of the pump on the basis of a signal representative of a level of refrigerant in the evaporator or concentration of the solution in the cycle. Further, according to the present invention, in the above-mentioned double effect absorption refrigerating machine, by providing a first bypass line having a cool/warm switching valve for directly introducing refrigerant vapor from the high temperature generator into the evaporator and a second bypass line having a cool/warm switching valve for directly introducing refrigerant vapor from the evaporator into a diluted solution circulating system, a double effect absorption cold/hot water generating machine can be obtained. In the above-mentioned absorption cold/hot water generating machine, it is preferable that a mechanism for stopping the solution spray pump during a warming operation is further provided.

OPERATION OF THE INVENTION

In the absorption refrigerating machine having the solution spray pump according to the present invention, by adjusting a flow rate of the solution spray pump, a disadvantage caused if an amount of refrigerant solution in the evaporator is insufficient, can be eliminated. That is to say, when the concentration of the solution in each cycle is decreased, if the amount of the refrigerant liquid in the evaporator is insufficient or if it is assumed that the amount of the refrigerant liquid in the evaporator is insufficient, the number of revolutions of the spray pump is also decreased, thereby decreasing the flow rate sent to a spraying device. A part of concentrated solution from the low temperature generator bypasses a heat transfer portion of the absorber and a part of another part of the concentrated solution from the low temperature generator enters a diluted solution side, thereby increasing the concentration of the diluted solution. As a result, the refrigerant in the evaporator is increased. In this way, cavitation in a refrigerant pump, which is caused when the refrigerant in the evaporator is insufficient, can be prevented.

In a double effect absorption refrigerating machine, the absorption solution is concentrated in a high temperature generator and is then directed to an absorber. However, since the pressure in the high temperature generator is considerably higher than the pressure in the absorber, the high pressure cannot be maintained by providing liquid-tight seals in a piping arrangement.

According to the present invention, the solution level at the outlet portion of the high temperature generator is detected, and, on the basis of the detected solution level, the flow-in amount of solution flowing into the high temperature generator is adjusted to maintain the solution level within a certain range. Further, when the pressure in the high temperature generator is changed, since the amount of solution flowing out of the high temperature generator is also changed to vary the solution level, the flow-in amount can be adjusted by detecting the level.

Further, when the amount of solution flowing into the low temperature generator is decreased, the concentration of the solution at the outlet portion of the low temperature generator is increased, and, thus, the boiling temperature of the solution is also increased accordingly. As a result, since the condensing temperature of the refrigerant vapor (for heating the low temperature generator) from the high temperature generator is increased, the pressure in the high temperature generator is also increased. Therefore, the amount of liquid circulating through the high temperature generator is also increased.

On the other hand, when the amount of solution flowing into the low temperature generator is increased, the concentration of the solution at the outlet portion of the low temperature generator is decreased, and, thus, the boiling temperature of the solution is also decreased accordingly. As a result, since the condensing temperature of the refrigerant vapor (for heating the low temperature generator) from the high temperature generator is decreased, the pressure in the high temperature generator is decreased. Therefore, the amount of the solution circulating through the high temperature generator is also decreased. In this way, the pressure in the high temperature generator is changed according to the amount of the solution flowing into the low temperature generator, and, thus, the amount of the solution circulating through the high temperature generator is changed.

The amounts of the solution circulating through the high and low temperature generators are associated with the efficiency of the refrigerating machine. In general, the less the circulating amounts (i.e. the greater the concentration width) the greater the efficiency. Since the amount of liquid circulating through the low temperature generator acts in an opposite (reverse) manner as the amount of the solution circulating through the high temperature generator and the amount of the solution circulating through the low temperature generator is preferential, the control of the amount of the solution circulating through the low temperature generator is important.

According to the present invention, the amount of the solution circulating through the low temperature generator is controlled by the pressure and temperature of the high temperature generator to achieve effective performance. In place of controlling the pressure of the high temperature generator, the amount of the solution circulating through the low temperature generator may be controlled on the basis of the saturated temperature or the condensing temperature (temperature at the heating side of the low temperature generator) of the refrigerant vapor generated in the high temperature generator.

In the present invention, since the solution circuit is divided into the first circuit for circulating the solution through the high temperature generator and the second circuit for circulating the solution through the low temperature generator so that the solution in the first circuit is directly introduced into the spraying device of the absorber by utilizing the pressure in the high temperature generator and the solution in the second circuit pressure which is lower than that of the solution in the first circuit is backed up by the solution spray pump, an amount of the solution backed up by the solution spray pump can be reduced to a half of that in the conventional cycle, thereby reducing the capacity of the solution.

DETAILED DESCRIPTION OF THE PREFERRED EMBODIMENTS

The present invention will now be explained more specifically with reference to the accompanying drawings. In the drawings, the same reference numerals or marks denote the same or corresponding members and overlapped explanations of them are decreased. It should be noted that the present invention is not necessarily limited to these embodiments.

Figure 1:
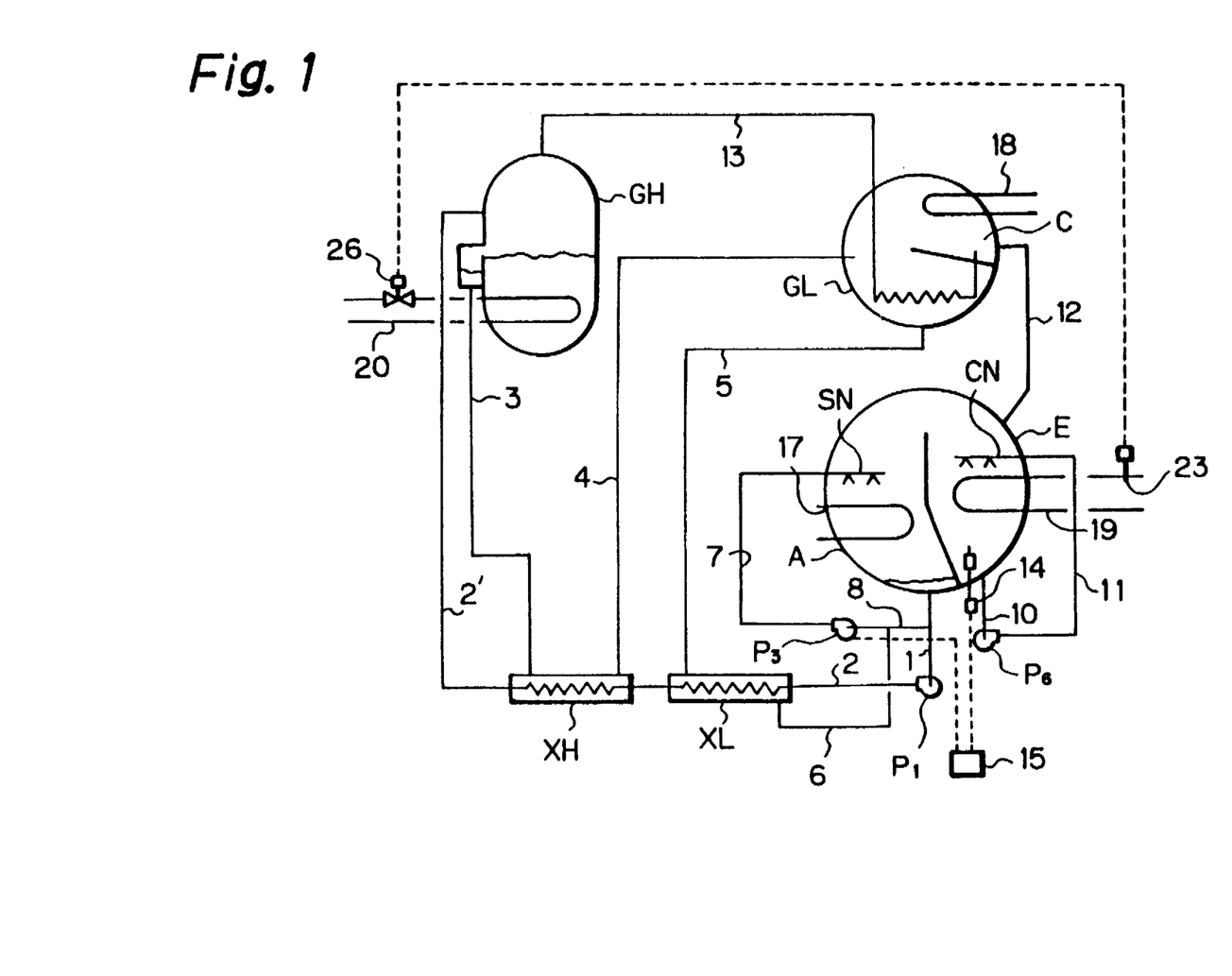
FIG. 1 is a hydraulic circuit of a double effect absorption refrigerating machine according to a first embodiment of the present invention.

FIG. 1 shows a hydraulic circuit of a double effect absorption refrigerating machine according to a first embodiment of the present invention. In FIG. 1, the hydraulic circuit is constituted by an absorber A, a low temperature generator GL, a high temperature generator GH, a condenser C, an evaporator E, a low temperature heat exchanger XL, a high temperature heat exchanger XH, a solution pump $P_1$, a refrigerant pump $P_6$, a solution spray pump $P_3$, solution circuits (paths) 1, 2, 2', 3–8, and refrigerant circuits (paths) 10 to 13. Further, there are provided cooling water pipings 17, 18, a cold water piping 19 connected to any cooling load, a heat source (piping) 20, a refrigerant level sensor 14, a controller 15 which controls the solution spray pump $P_3$, and a heat amount controller 26 for controlling the heat amount supplied from the heat source 20 to said high temperature generator.

In a cooling operation of the above-mentioned absorption refrigerating machine, a diluted solution into which refrigerant is absorbed is directed from the absorber A to heated sides of the low temperature heat exchanger XL and the high temperature generator XH by means of the solution pump $P_1$ and then is introduced into the high temperature generator GH through the circuit 2'.

In the high temperature generator GH, the diluted solution is heated by the heat source 20 to generate the refrigerant gas, thereby increasing the concentration of the diluted solution to form concentrated solution. The concentrated solution is sent, through the circuit 3, to the high temperature heat exchanger XH, where heat exchange is effected, and then, the solution is introduced into the low temperature generator GL through the circuit 4. In the low temperature generator, the solution is heated and concentrated by the refrigerant vapor from the high temperature generator, and then is sent to a heating side of the low temperature heat exchanger XL through the circuit 5. Then, the solution is sent to the solution pump $P_3$ through the circuit 6, and then is introduced into the absorber A through the circuit 7 and a solution spray nozzle SN.

The refrigerant gas generated in the high temperature generator GH is passed through the refrigerant circuit 13 to the low temperature generator GL where the refrigerant gas is used as a heat source and condensed. Then, the refrigerant is introduced into the condenser C. In the low temperature generator GL, the diluted solution is heated by the refrigerant gas sent from the high temperature generator to generate a refrigerant gas from the diluted solution in the low temperature generator. In the condenser C, the refrigerant gas generated in the low temperature generator GL is cooled and condensed by cooling water 18, and then is introduced into the evaporator E through the circuit 12. In the evaporator E, the refrigerant is circulated through the circuits 10, 11 and a refrigerant spray nozzle CN by means of the refrigerant pump $P_6$ to be evaporated; meanwhile, heat of vaporization is removed from a loading side to further cool the cold water 19, which is used to the cooling operation.

The evaporated refrigerant is absorbed by the concentrated solution in the absorber A to form the diluted solution which is in turn circulated by means of the solution pump $P_1$. Normally, the solution spray pump $P_3$ sends the diluted solution to the solution spray nozzle SN of the absorber by the amount of which corresponds to a flow rate of solution sent to the low temperature generator, or more.

In the absorption refrigerating machine, when the amount of the refrigerant liquid in the evaporator E is insufficient, or when it is guessed that the amount of the refrigerant liquid in the evaporator is insufficient (the amount of the refrigerant is decreased as the concentration of the solution in each cycle is decreased), the number of revolutions of the solution spray pump $P_3$ is decreased, thereby decreasing the flow rate sent to the spray nozzle SN.

A part of the concentrated solution from the low temperature generator GL bypasses the heat transfer portion of the absorber A and enters the diluted solution side through the circuit 8, thereby increasing concentration of the diluted solution. As a result, the refrigerant in the evaporator is increased. In this way, cavitation in the refrigerant pump, which is caused when the refrigerant in the evaporator is insufficient, is prevented.

Figure 2A:
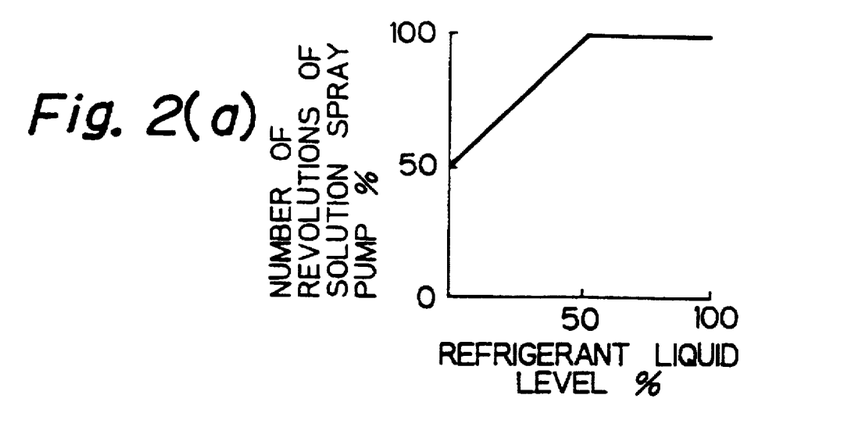
FIGS. 2(a) to 2(c) are graphs each showing the control of number of revolutions of a solution spray pump.
Figure 2B:
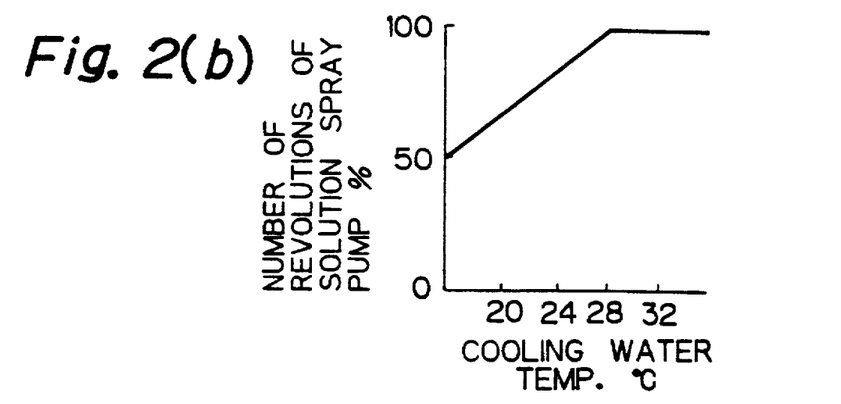
Figure 2C:
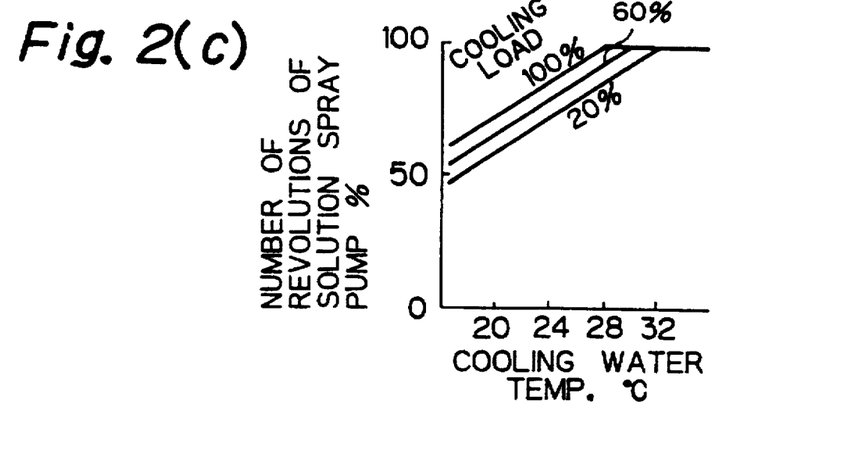

Now, a concrete controlling method will be explained with reference to FIG. 2(a) which shows that the number of revolutions of the solution spray pump $P_3$ is controlled by the controller 15 on the basis of a signal from the refrigerant level sensor 14. FIG. 2(b) shows that the number of revolutions of the solution spray pump is controlled on the basis of a temperature of cooling water 17 or the concentration of the diluted solution which is closely associated with the temperature of the cooling water, and FIG. 2(c) shows that the number of revolutions of the solution spray pump is controlled on the basis of a signal representative of the temperature of the cooling water 17 and a cooling load 19. In this way, the number of revolutions of the solution spray pump can be controlled on the basis of the temperature of the cooling water, or the combination of the temperature of the cooling water and the cooling load. While the double effect absorption refrigerating machine was explained, it should be noted that the same advantage can be obtained in a single effect absorption refrigerating machine.

Figure 5:
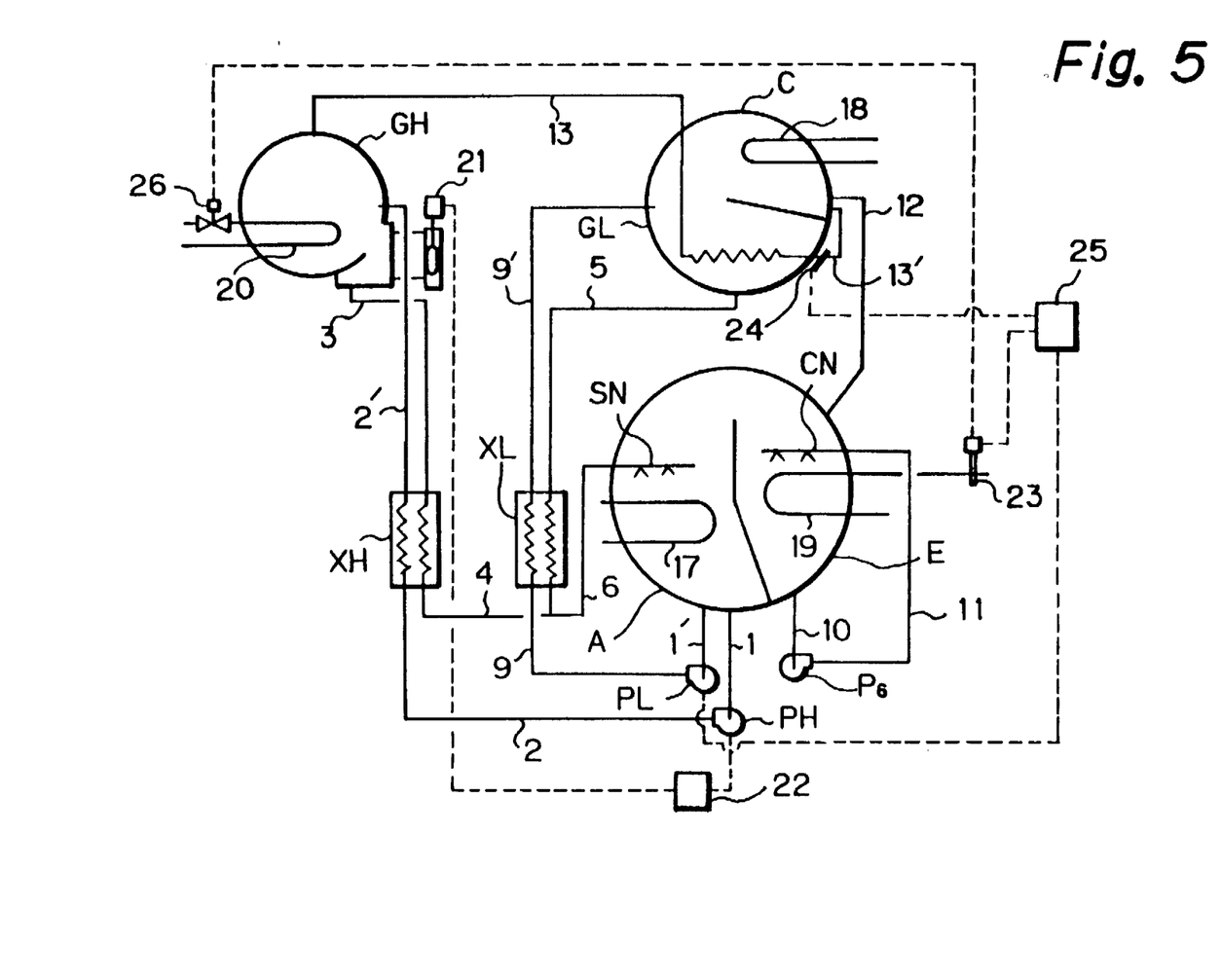
FIG. 5 is a hydraulic circuit of a double effect absorption refrigerating machine according to a second embodiment of the present invention.

FIG. 5 shows a hydraulic circuit of a double effect absorption refrigerating machine according to a second embodiment of the present invention. In FIG. 5, the hydraulic circuit includes a low head pump PL for the low temperature generator GL, a high head pump PH for the high temperature generator GH, a refrigerant pump solution paths 9, 9', a refrigerant path 13, a sensor 21 for detecting a level of liquid in the high temperature generator, a controller 22 for controlling the number of revolutions of the high head pump, temperature sensors 23, 24, a controller 25 for controlling the number of revolutions of the low head pump, and a heat source heat amount controller 26.

In a cooling operation of the absorption refrigerating machine of FIG. 5, a part of the diluted solution into which refrigerant is absorbed is directed from the absorber A to a heated side of the low temperature heat exchanger XL by means of the low head pump PL through the path 9 and is then introduced into the low temperature generator GL through the path 9'. After the diluted solution is heated and concentrated by the heat of the refrigerant vapor from the high temperature generator, the concentrated solution is directed from the path 5 through a heating side of the low temperature heat exchanger XL to the path 6.

On the other hand, the remaining dilute solution from the absorber A is directed through path 2 to a heated side of the high temperature heat exchanger XH by means of the high head pump PH and is then introduced into the high temperature generator GH through the path 2'. In the high temperature generator GH, the diluted solution is heated by the heat source 20, so that the refrigerant is vaporized to form concentrated solution. The concentrated solution is sent, through the path 3, to the high temperature heat exchanger XH, where the heat exchange is effected. Then, the concentrated solution is conveyed through the path 4 to be mixed with the concentrated solution from the low temperature heat exchanger XL before being introduced into the absorber A through the solution spray nozzle SN.

The refrigerant gas vaporized in the high temperature generator GH is sent, through the refrigerant path 13, to the low temperature generator GL, where the refrigerant gas from the high temperature generator is used as a heat source and condensed to a refrigerant liquid. Then, the refrigerant liquid is introduced into the condenser C through a path 13'. In the condenser C, the refrigerant gas generated in the low temperature generator is cooled and condensed by the cooling water 18 and is then sent to the evaporator E through a path 12. In the evaporator E, the refrigerant is circulated through the paths 10, 11 by means of the refrigerant pump $P_6$, thereby vaporizing the refrigerant. While the refrigerant is being vaporized, heat of vaporization is taken away from the cold water in a piping 19 in the cooling load to further cool the cold water, which is used in the cooling action. The vaporized refrigerant is absorbed into the concentrated solution in the absorber A to form the diluted solution, which is in turn circulated by the pumps.

In such a cooling operation, according to the present invention, the number of revolutions of the high head pump PH is controlled by the revolution number controller 22 on the basis of the signal from the liquid level sensor 21 for the high temperature generator, thereby adjusting the amount of solution circulating through the high temperature generator. Further, the circulating amount of solution to the low temperature generator is adjusted by controlling the number of revolutions of the low head pump PL to maintain a saturated temperature of the high temperature generator detected by the temperature sensor 24 within a predetermined range. The number of revolutions of the low head pump PL can be controlled by the saturated temperature of the high temperature generator GH, however, it also can be controlled by the manner as shown in FIGS. 6(a) and 6(b).

Figure 6A:
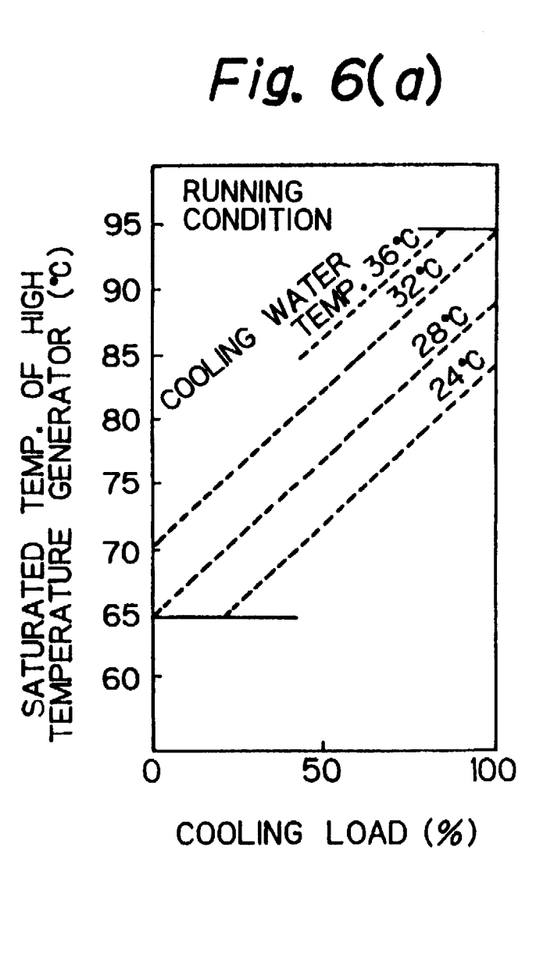
FIG. 6(a) is a graph showing a relation between a cooling load and a refrigerant vapor saturated temperature of a high temperature generator.
Figure 6B:
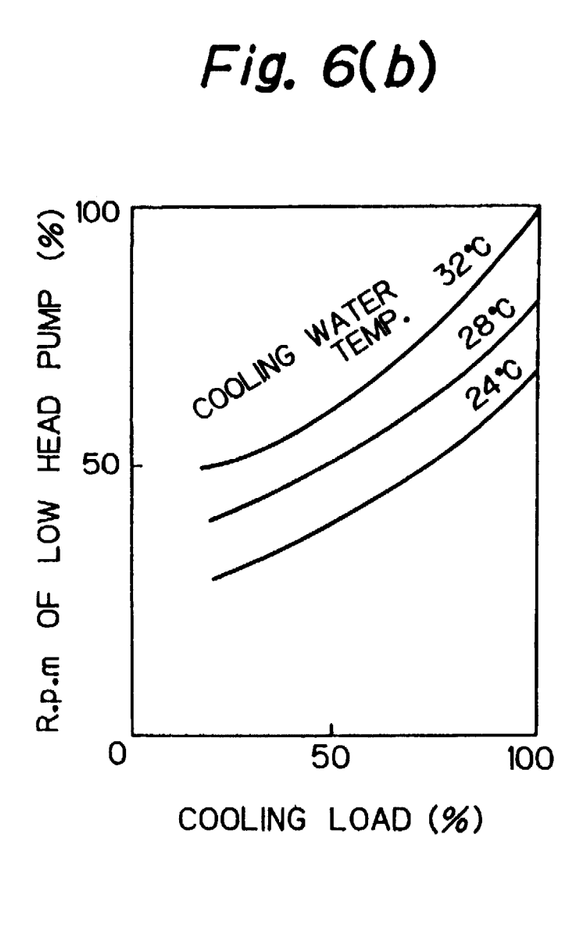
FIG. 6(b) is a graph showing an example of a control effected on the basis of the cooling load.

FIG. 6(a) shows a relation between the cooling load and the saturated temperature of the high temperature generator. Since the saturated temperature is proportional to the cooling load, as shown in FIG. 6(a), the basic or fundamental number of revolutions of the low head pump PL may be determined on the basis of the cooling load (temperature of the cooling water detected by the temperature sensor 23), thereby controlling the circulating amount of solution to the low temperature generator. Alternatively, since the relation between the cooling load and the heat amount of the heat source (determined by the heat amount controller 26) is substantially constant in the stable operating condition (normal condition), instead of the cooling load signal, the amount of heat at the heat source may be used.

Figure 7:
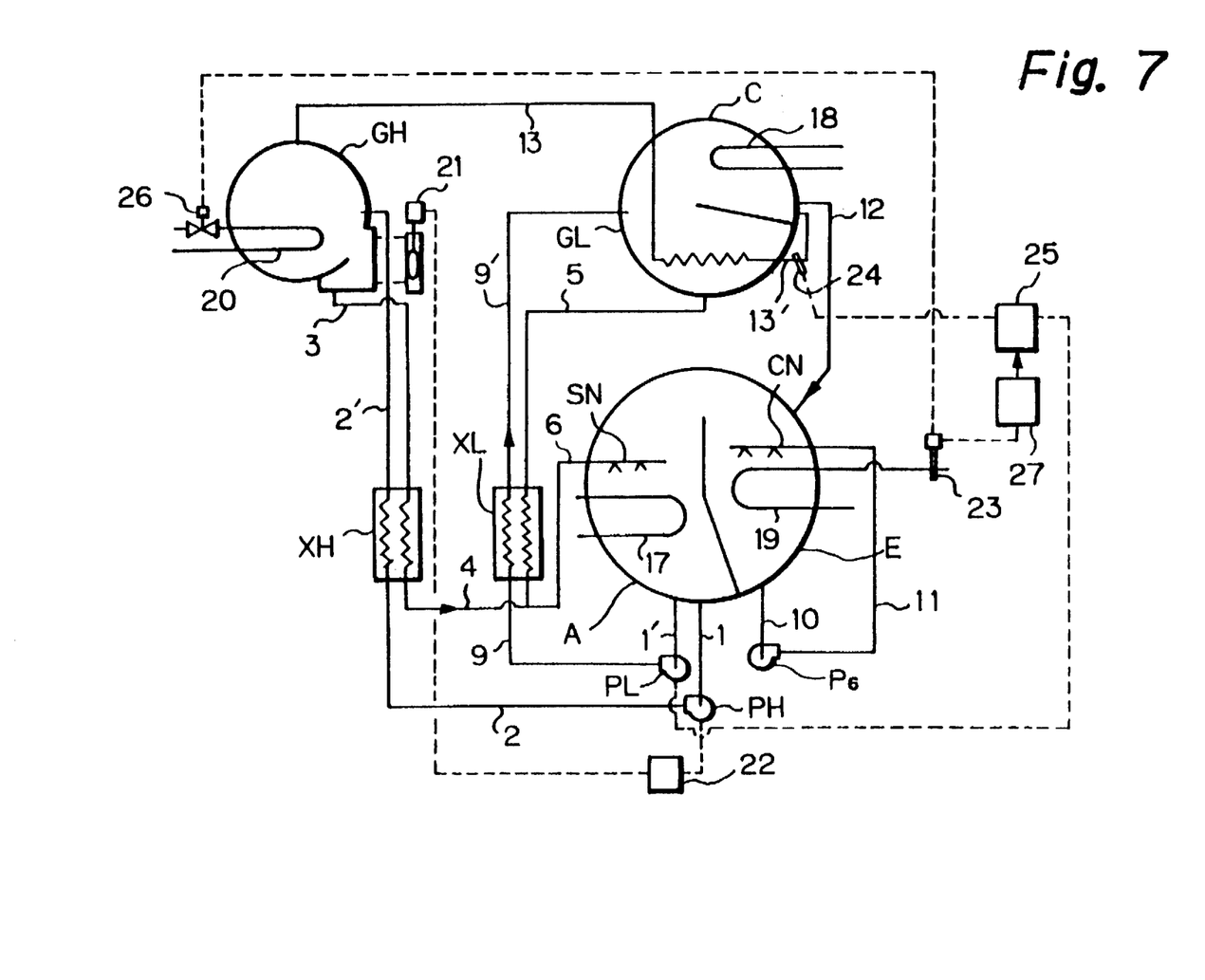
FIG. 7 is a hydraulic circuit of a double effect absorption refrigerating machine according to a third embodiment of the present invention.

FIG. 7 shows a hydraulic circuit of a double effect absorption refrigerating machine according to a third embodiment of the present invention. A target concentrating temperature of the vapor from the high temperature generator GH is set on the basis of the heat amount of the heat source or the cooling load (temperature of cold water) used by a setting device 27, and, the number of revolutions of the low head pump is adjusted to attain such a target temperature by means of the controller 25.

Figure 8:
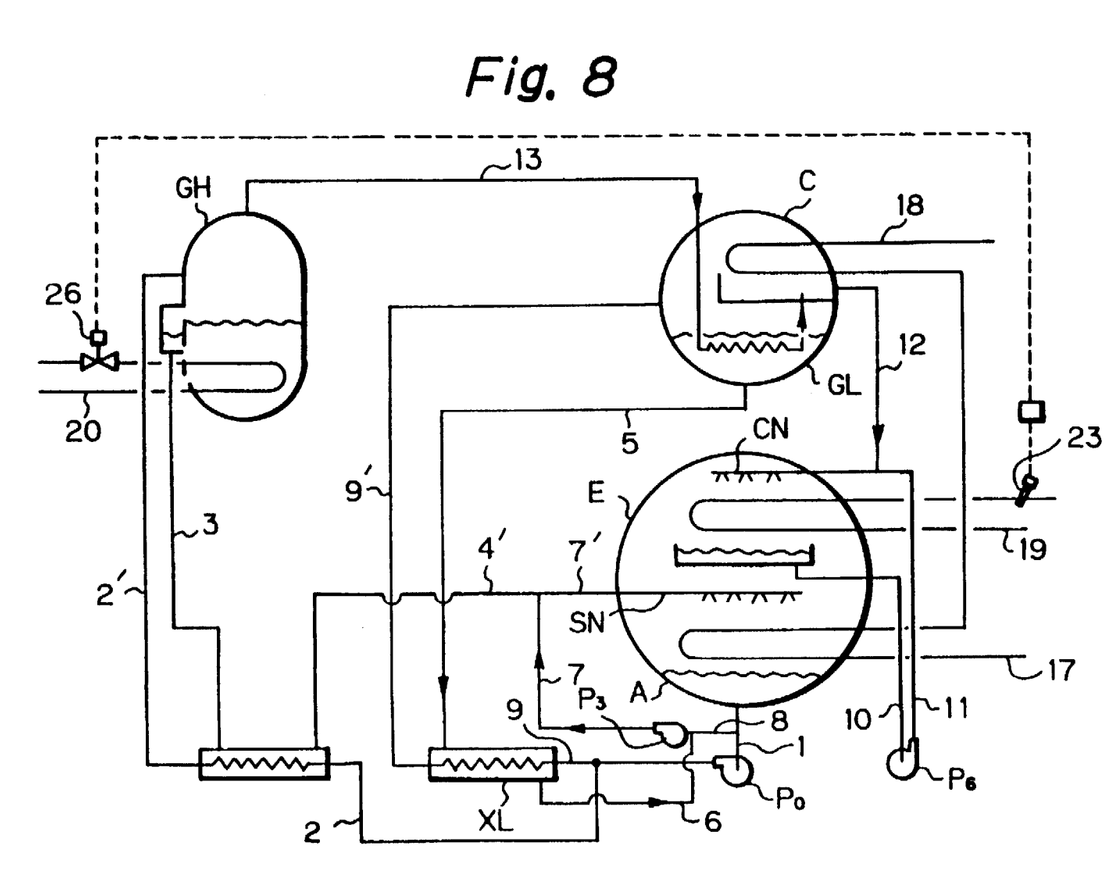
FIG. 8 is a hydraulic circuit of a double effect absorption refrigerating machine according to a fourth embodiment of the present invention.

FIG. 8 shows a hydraulic circuit of a double effect absorption refrigerating machine according to a fourth embodiment of the present invention. In FIG. 8, the hydraulic circuit includes a solution pump $P_0$, a refrigerant pump $P_6$, a solution spray pump $P_3$, a solution circuit 7' and 9'.

In a cooling operation of the absorption refrigerating machine of FIG. 8, a part of diluted solution into which refrigerant is absorbed is directed from the absorber A to a heated side of the high temperature generator XH through path 2 by means of the solution pump $P_0$ and is then introduced into the high temperature generator GH through the path 2'. In the high temperature generator GH, the diluted solution is heated by a heat source to evaporate the refrigerant, thereby concentrating the diluted solution to form a concentrated solution. The concentrated solution is sent, through the path 3, to the high temperature heat exchanger XH, where heat exchange is effected, and then, the solution is introduced into the absorber A through the paths 4' and 7'.

On the other hand, the remaining diluted solution passed through the solution pump $P_0$ is introduced into a heated side of the low temperature heat exchanger XL through the path 9 and is then introduced into the low temperature generator GL through the circuit 9'. In the low temperature generator, the solution is heated and concentrated by the heat of the refrigerant vapor from the high temperature generator, and then the solution is sent to a heating side of the low temperature heat exchanger XL through the path 5. Then, the solution is sent to the solution spray pump $P_3$ through the path 6, and is then introduced into the absorber A through the paths 7 and 7'.

The refrigerant gas evaporated in the high temperature generator GH is passed through the refrigerant path 13, to the low temperature generator GL where the refrigerant gas is used as a heat source therefor. Then, the refrigerant gas is condensed and introduced into the condenser C. In the condenser C, the refrigerant gas from the low temperature generator GL is cooled and condensed by cooling water, and is then introduced into the evaporator E through the path 12. In the evaporator E, the refrigerant is circulated through the paths 10, 11 by means of the refrigerant pump $P_6$ to be evaporated; meanwhile, heat of vaporization is removed from a loading side to further cool the cold water, which is used for a cooling operation. The evaporated refrigerant is absorbed by the concentrated solution in the absorber A to form the diluted solution which is in turn circulated by means of the solution pump.

Figure 10:
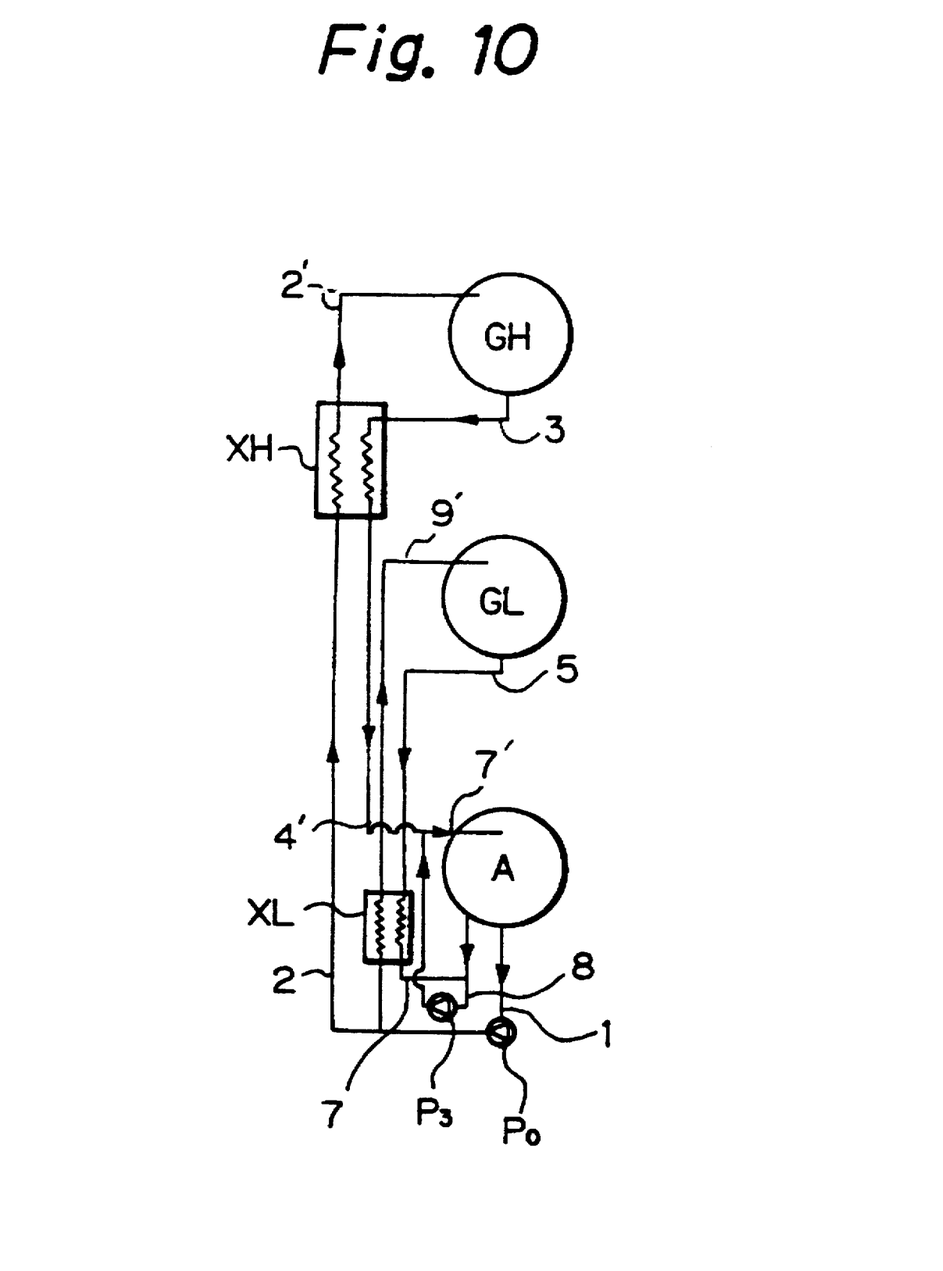
FIG. 10 is a view showing a flow of the solution of the refrigerating machine of FIG. 8.
Figure 12:
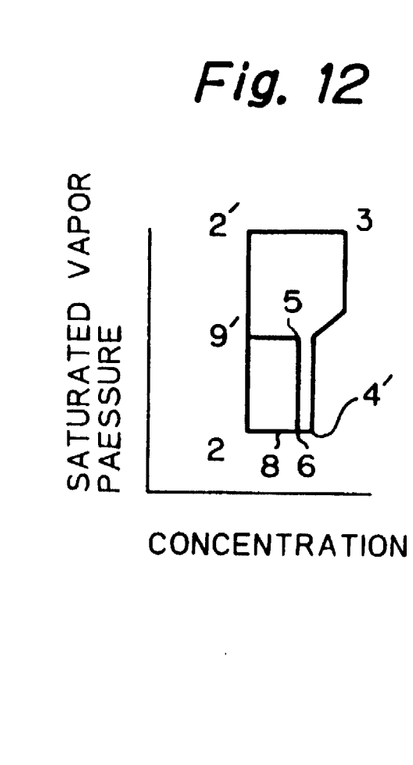
FIG. 12 is a graph showing a cycle of the solution in the refrigerating machines of FIGS. 8 and 9.

FIG. 10 shows the flow of the solution of the refrigerating machine of FIG. 8, and FIG. 12 is a graph showing the cycle of the solution. As mentioned above, in FIG. 8, since the solution spray pump $P_3$ is disposed independently, a flow rate passing through this pump can be adjusted. Normally, the solution spray pump is controlled so that it sends the amount of the solution to the spray nozzle SN of the absorber by an amount corresponding to the flow rate of solution sent to the low temperature generator GL or more.

Figure 9:
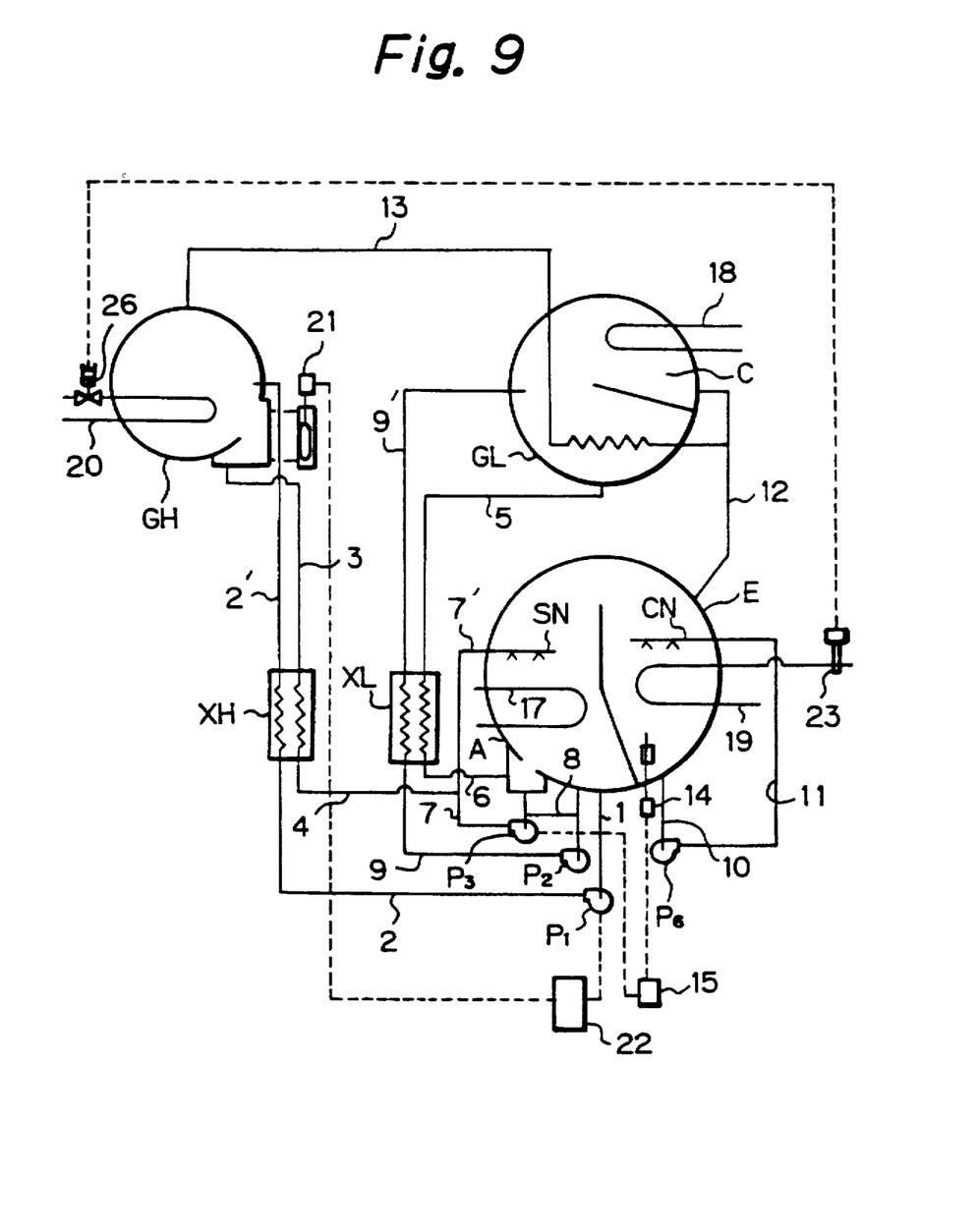
FIG. 9 is a hydraulic circuit of a double effect absorption refrigerating machine according to a fifth embodiment of the present invention.

FIG. 9 shows a hydraulic circuit of a double effect absorption refrigerating machine according to a fifth embodiment of the present invention. In FIG. 9, a solution pump means comprises a solution pump $P_1$ for circulating solution through the high temperature generator GH and a solution pump $P_2$ for circulating solution through the low temperature generator GL. Further, there are provided a refrigerant level sensor 14 and a controller 15 which control the solution spray pump $P_3$, and a concentrated solution (in the high temperature generator GH) level sensor 21 and a controller 22 which control an amount of diluted solution circulating through the high temperature generator GH.

In the absorption refrigerating machine in FIG. 9, when the amount of the refrigerant liquid in the evaporator E is insufficient or when it is guessed that the amount of the refrigerant liquid in the evaporator is insufficient (the refrigerant is decreased as the concentration of the solution in each cycle is decreased), the number of revolutions of the solution spray pump $P_3$ is decreased, thereby decreasing the flow rate of the solution sent to the spray nozzle SN. A part of the concentrated solution from the low temperature generator GL bypasses the heat transfer portion of the absorber A and enters the diluted solution side, thereby increasing concentration of the diluted solution. As a result, the refrigerant in the evaporator is increased. In this way, cavitation in the refrigerant pump, which is caused when the refrigerant in the evaporator is insufficient, is prevented. In this embodiment, a concrete controlling method will be the same as that explained with reference to FIG. 2.

Figure 11:
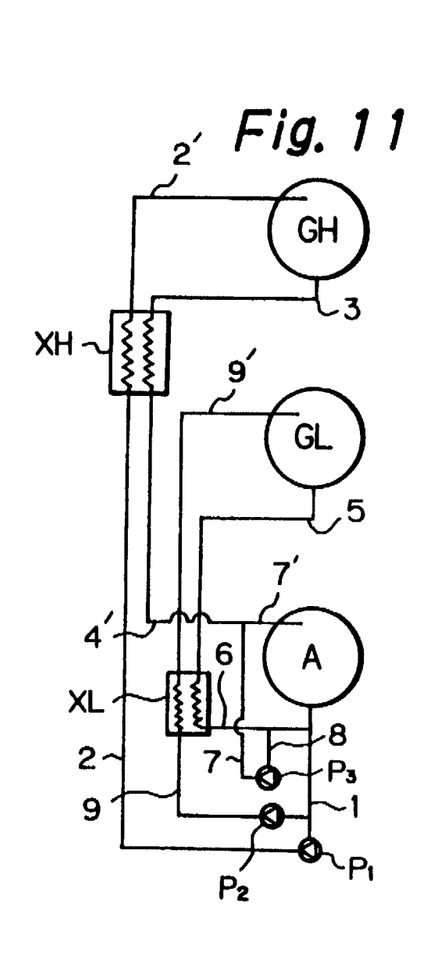
FIG. 11 is a view showing a flow of the solution of the refrigerating machine of FIG. 9.

FIG. 11 shows the flow of the solution of the refrigerating machine of FIG. 9, and FIG. 12 is a graph showing the cycle of the solution.

Figure 13:
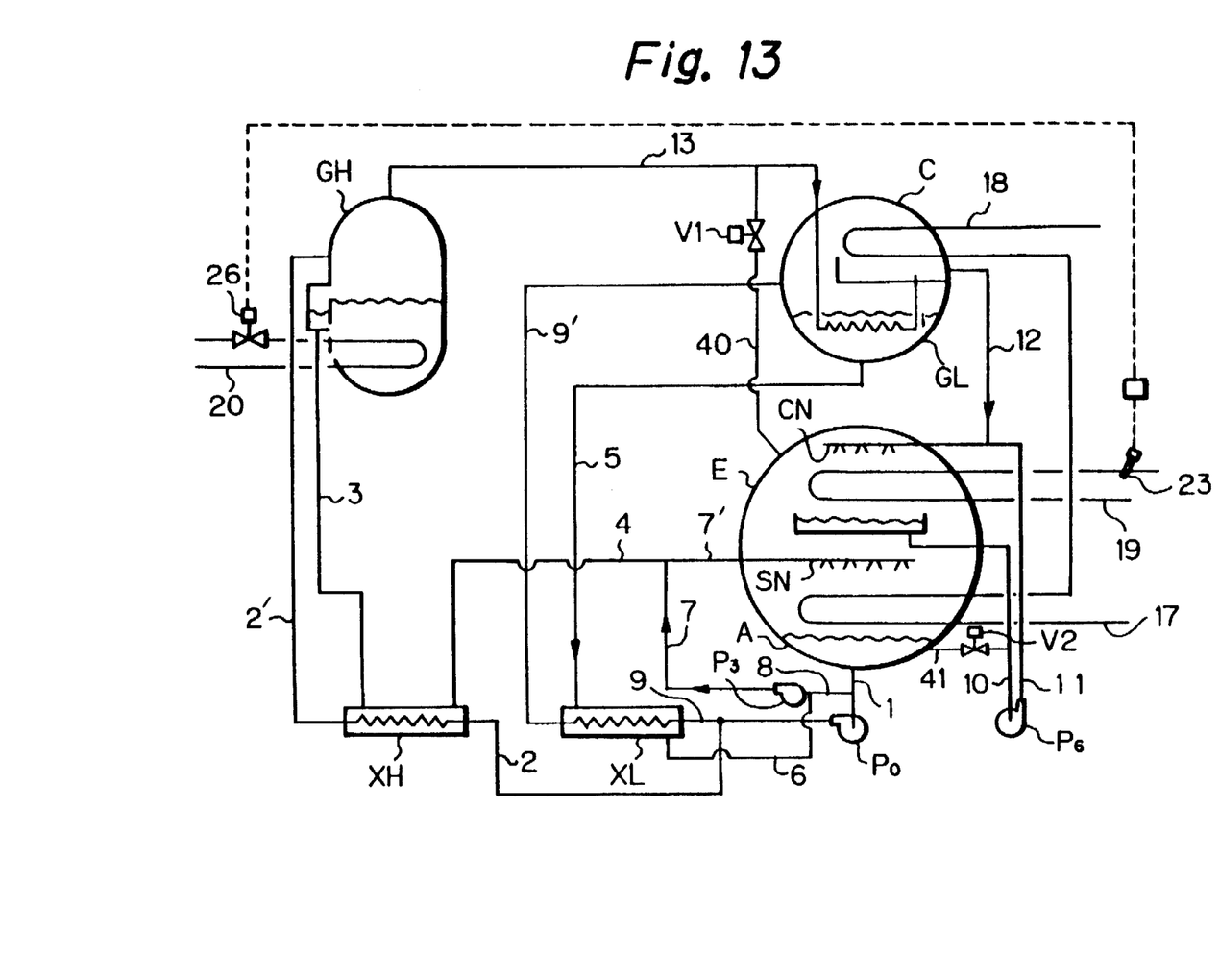
FIG. 13 is a hydraulic circuit of a double effect absorption refrigerating machine according to a sixth embodiment of the present invention.

FIG. 13 shows a hydraulic circuit of a double effect absorption cold or hot water generating machine according to a sixth embodiment of the present invention which can be used in both a cooling operation and a warming operation and which is obtained by providing cool/warm switching valves $V_1$, $V_2$ in the double effect absorption refrigerating machine.

The absorption refrigerating machine of FIG. 13 comprises, in addition to the constitutions of the absorption refrigerating machine shown in FIG. 1, a first bypass line 40 having a cool/warm switching valve $V_1$ for directly introducing refrigerant vapor from the high temperature generator into the evaporator, and a second bypass line 41 having a cool/warm switching valve $V_2$ for directly introducing refrigerant liquid from the evaporator into a diluted solution circulating system.

In FIG. 13, during the warming operation, the cool/warm switching valves $V_1$, $V_2$ are opened, so that the vapor from the high temperature generator is introduced into a cylindrical case constituting A/E (absorber/evaporator), thereby heating hot water passing through a tube in the evaporator. In this case, the refrigerant vapor condenses to form drain (refrigerant liquid) which is in turn returned to the diluted solution circulating system through the valve $V_2$.

Further, in this embodiment, the absorber does not carry out the absorbing operation, but merely flushes the hot solution, whereby the temperature of the hot solution approaches a saturated temperature corresponding to the refrigerant pressure for the evaporator E. Thus, even when the solution spray pump $P_3$ is stopped, no problem occurs. Accordingly, the solution spray pump is stopped, thereby saving on power which would otherwise be needed to drive the pump. Further, when a low head pump such as the solution pump $P_2$ for the low temperature generator as shown in FIG. 9 is used, the low head pump and the solution spray pump can be stopped, thereby also saving on power.

EFFECT OF THE INVENTION

According to the present invention, since the solution spray pump is controlled by the level of the refrigerant liquid in the evaporator or the concentration of the solution in the cycle, the amount of the refrigerant liquid can be adjusted in the evaporator, thereby running the absorption refrigerating machine safety and efficiently.

In the present invention, since the level of solution in the high temperature generator is adjusted by the controller for adjusting the amount of solution circulating through the high temperature generator (for example, adjusting the number of revolutions of the high head pump), and since the pressure or the saturated temperature of the high temperature generator is adjusted by the controller for adjusting the amount of liquid circulating through the low temperature generator (for example, adjusting the number of revolutions of the low head pump), the effective performance can be stably achieved following the cooling load.

In the present invention, since the solution spray pump can be operated independently from the solution circuit, the amount of the solution backed up by the solution spray pump can be reduced to a half of that the conventional cycle and such an amount can be adjusted, thereby it is achieved that the refrigerating machine can be operated safely and efficiently.

What is claimed is:

1. An absorption refrigerating machine wherein a refrigerant gas separated from a solution at a generator is cooled and becomes a liquid refrigerant, said liquid refrigerant then evaporates at an evaporator (E) so that a cooling load (19) in said evaporator is cooled, and a concentrated solution generated in said generator is directed through a heat exchanger to a solution spray nozzle in an absorber (A), characterized in that said absorption refrigerating machine comprises:

a concentrated solution spray pump disposed between said heat exchanger and said spray nozzle, a concentrated solution controller (15) operatively connected to said concentrated solution spray pump for controlling a supply of the concentrated solution to said absorber (A), said controller (15) being operative to control said pump to increase said supply of concentrated solution to said absorber (A) when a refrigerant liquid level in said evaporator is higher than a given value, and to decrease said supply of concentrated solution to said absorber (A) when the refrigerant liquid level in said evaporator is less than said given value, and means for determining a level of refrigerant liquid level in said evaporator operatively connected to said controller.

2. An absorption refrigerating machine according to claim 1, wherein said concentrated solution controller (15) increases or decreases said flow rate of the concentrated solution to be supplied to said absorber (A) by increasing or decreasing a number of revolutions of said solution spray pump ($P_3$).

3. An absorption refrigerating machine according to claim 1, wherein said generator comprises a high temperature generator (GH) and a low temperature generator (GL), said heat exchanger comprises a high temperature heat exchanger (XH) and a low temperature heat exchanger (XL), a refrigerant gas generated at said high temperature generator (GH) is used as a heat source of said low temperature generator (GL), a concentrated solution is directed from said high temperature generator (GH) through said high temperature heat exchanger (XH) to said low temperature generator (GL), a concentrated solution is directed from said low temperature generator (GL) through said low temperature heat exchanger (XL) and said solution spray pump ($P_3$) to said absorber (A), and a diluted solution is directed from said absorber (A) through said low temperature heat exchanger (XL) and said high temperature heat exchanger (XH) to said high temperature generator (GH), whereby a double effect absorption refrigerating machine is constituted.

4. An double effect absorption refrigerating machine wherein a refrigerant gas generated at a high temperature generator (GH) is used as a heat source of a low temperature generator (GL), a diluted solution is directed from an absorber (A) through a high head pump (PH) and a high temperature heat exchanger (XH) to said high temperature generator (GH), a concentrated solution is directed from said high temperature generator (GH) through said high temperature heat exchanger (XH) to said absorber (A), a diluted solution is directed from said absorber (A) through a low head pump (PL) and a low temperature heat exchanger (XL) to said low temperature generator (GL), and a concentrated solution is directed from said low temperature generator (GL) through said low temperature heat exchanger (XL) to said absorber (A), said refrigerating machine comprising:

a heat amount controller (26) for controlling a heat amount supplied from a heat source (20) to said high temperature generator (GH) on the basis of a cooling load or a cold water temperature, a first diluted solution controller (22) for controlling a flow rate of said diluted solution directed to said high temperature generator (GH) on the basis of a signal indicative of a solution level at said high temperature generator (GH) a pressure in said low temperature generator, or the like, and a second diluted solution controller (25) for controlling a flow rate of said diluted solution directed to said low temperature generator (GL) on the basis of at least one of factors in a group of said heat amount supplied from said heat source, said cooling load, said cold water temperature, a pressure or a temperature in said high temperature generator (GH), a refrigerant gas saturated temperature, a refrigerant gas condensing temperature, and a heating side temperature of said low temperature generator (GL).

5. A double effect absorption refrigerating machine according to claim 4, wherein said first diluted solution controller (22) comprises an inverter for controlling a number of revolutions of said high head pump (PH) or a diluted solution control valve, and said second diluted solution controller (25) comprises an inverter for controlling a number of revolutions of said low head pump (PL) or a diluted solution control valve.

6. A double effect absorption refrigerating machine according to claim 4, wherein said second diluted solution controller (25) is operated so that the pressure in said high temperature generator becomes a target pressure, or so that the refrigerant gas saturated temperature becomes a target saturated temperature.

7. A double effect absorption refrigerating machine according to claim 6, wherein said target pressure or said target saturated temperature is corrected by a temperature of said cooling water.

8. A double effect absorption refrigerating machine including an absorber (A), a solution pump ($P_0$, $P_1$), a high temperature heat exchanger (XH), a low temperature heat exchanger (XL) and a solution spray pump ($P_3$) wherein a refrigerant gas generated at said high temperature generator (GH) is used as a heat source of said low temperature generator (GL), comprising:

means for directing a diluted solution from the absorber (A) through said solution pump ($P_0$, $P_1$) and said high temperature heat exchanger (XH) to said high temperature generator (GH), means for directing a concentrated solution from said high temperature generator (GH)

through said high temperature heat exchanger (XH) to said absorber (A), means for directing a diluted solution from said absorber (A) through said solution pump ($P_0$, $P_1$) and said low temperature heat exchanger (XL) to said low temperature generator (GL), means for directing a concentrated solution from said low temperature generator (GL) through said low temperature heat exchanger (XL) and said solution spray pump ($P_3$) to said absorber (A), and a concentrated solution controller (15) operative to control a flow of said concentrated solution from said low temperature generator (GL) to said absorber (A).

9. A double effect absorption refrigerating machine according to claim 8, wherein said concentrated solution controller (15) controls a number of revolutions of said solution spray pump ($P_3$) on the basis of a signal indicative of a refrigerant liquid level in an evaporator (E).

10. A double effect absorption refrigerating machine according to claim 8, further comprising at least one of elements from a group including a first cool/warm switching valve ($V_1$) for directly introducing refrigerant gas from said high temperature generator (GH) into an evaporator (E) during warming operation of said machine, a second cool/warm switching valve ($V_2$) for directly introducing refrigerant liquid from said evaporator (E) into a diluted solution circulating system during warming operation of said machine, and a mechanism for stopping said solution spray pump ($P_3$) during warming operation of said machine.

11. An absorption refrigerating machine according to claim 1 wherein said refrigerant liquid level determining means comprises a refrigerant liquid level sensor in said evaporator operative to generate a control signal indicative of the sensed refrigerant liquid level.

12. An absorption refrigerating machine according to claim 1 wherein said refrigerant liquid level determining means comprises means for determining solution concentration operative to generate a control signal indicative of the determined solution concentration.

13. An absorption refrigerating machine according to claim 1 wherein said refrigerant liquid level determining means comprises a cooling water temperature sensor operative to generate a control signal indicative of the sensed temperature.

14. A double effect absorption refrigerating machine according to claim 8 wherein said concentrated solution controller controls a number of revolutions of said solution spray pump on the basis of a signal indicative of solution concentration.

* * * * *

UNITED STATES PATENT AND TRADEMARK OFFICE
CERTIFICATE OF CORRECTION

PATENT NO. : 5,592,825
DATED : January 14, 1997
INVENTOR(S) : Inoue

It is certified that error appears in the above-indentified patent and that said Letters Patent is hereby corrected as shown below:

Title page, item [54], "Refrigeration" should read --Refrigerating"--.

Signed and Sealed this

First Day of July, 1997

Attest:

BRUCE LEHMAN

*Attesting Officer*  *Commissioner of Patents and Trademarks*